(12) United States Patent
Itoigawa et al.

(10) Patent No.: US 6,336,658 B1
(45) Date of Patent: Jan. 8, 2002

(54) ACCELERATION SWITCH AND THE MANUFACTURING METHOD

(75) Inventors: Koichi Itoigawa; Yutaka Yoshida; Makoto Murate, all of Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/388,030

(22) Filed: Sep. 1, 1999

(30) Foreign Application Priority Data

Sep. 9, 1998 (JP) ............................................ 10-255178

(51) Int. Cl.[7] ........................... B60R 21/32; G01P 15/00
(52) U.S. Cl. ................ 280/735; 180/282; 200/61.45 R; 73/514.36
(58) Field of Search ........................ 280/735; 180/282; 200/61.45 R; 257/415; 73/514.01, 514.35, 514.36

(56) References Cited

U.S. PATENT DOCUMENTS 4,706,374 A * 11/1987 Murakami
4,855,544 A * 8/1989 Glenn
5,138,414 A * 8/1992 Shinohara
5,157,472 A * 10/1992 Takemura
5,177,331 A * 1/1993 Rich et al.
5,342,089 A * 8/1994 Fink et al.
5,594,172 A * 1/1997 Shinohara
5,828,138 A * 10/1998 McIver et al.
5,905,203 A * 5/1999 Flach et al.
6,236,005 B1 * 5/2001 Kvisteroey et al. ..................

* cited by examiner

Primary Examiner—Paul N. Dickson
(74) Attorney, Agent, or Firm—Sheridan Ross P.C.

(57) ABSTRACT

A small acceleration switch adapted to switch between ON and OFF states depending upon the magnitude of acceleration applied to the switch. The acceleration switch includes a first contact formed on a substrate and a movable part formed on a semiconductor chip by surface micromachining. The movable part includes a second contact. When the acceleration is equal to or greater than a predetermined value, the movable part moves and the second contact comes into contact with the first contact.

14 Claims, 7 Drawing Sheets

ACCELERATION SWITCH AND THE MANUFACTURING METHOD

BACKGROUND OF THE INVENTION

The present invention relates to an acceleration switch and a method of manufacturing the same.

Recently, many cars have been equipped with air bags. Generally, an air bag system comprises an air bag, an inflator and an ECU (electronic control unit). A sudden change in acceleration caused by a car collision is sensed by an acceleration sensor, which is a part of the ECU. An acceleration sensor for sensing a collision employs, for example, a semiconductor type acceleration sensor, in which a strain gauge is formed on a beam supporting a mass. When an applied acceleration is equal to or greater than a set value, the ECU actuates the inflator to inflate the air bag.

A mechanical acceleration switch 51 has been proposed in the prior art, which is shown schematically in FIG. 10. The acceleration switch 51 comprises a switch body 52, and two inertia weights 53, 54 located in a space inside the switch body 52. The first inertia weight 53 is spherical in shape, and has an eccentric shaft 59 positioned eccentrically relative to its center of gravity. The first inertia weight 53 is rotatably supported at its eccentric shaft by the switch body 52. The first inertia weight 53 is connected to the second inertia weight 54 by a beam 55. The second inertia weight 54 is smaller and lighter than the first inertia weight 53. Also, a pair of terminals 56, 57 provided with contacts at their distal ends are arranged in the vicinity of the second inertia weight 54. These terminals 56, 57 are electrically connected to an unillustrated printed circuit board, on which an acceleration sensor, switching elements and the like are mounted.

When the acceleration switch 51 is accelerated, a movable part composed of the first and second inertia weights 53, 54 and the beam 55 is subjected to the force of inertia, which tends to move the movable part relative to the switch body 52. If the acceleration is great enough, the force of inertia turns the heavy first inertia weight 53 as well as the second inertia weight 54 and the beam 55 about the eccentric shaft 59. Then a push portion 58 provided on the beam 55 comes into contact with one of the terminals 56, and the terminal 56 is pushed into contact with the terminal 57. On the other hand, if the acceleration is relatively small, the first inertia weight 53 cannot revolve around the eccentric shaft 59, and the push portion 58 does not contact the terminal 56. Therefore, the terminal 56 does not contact the terminal 57. In this manner, with the acceleration switch 51, the terminals 56, 57 contact each other only when an acceleration exceeding the set value is applied.

Acceleration sensors are being miniaturized, but miniaturization is presently thwarted by the acceleration switch 51 since the acceleration switch 51 is mechanical as shown in FIG. 10. Accordingly, an ECU provided with a mechanical type acceleration switch 51 is comparatively bulky.

Also, if the acceleration switch 51 were made smaller, the sensitivity of the switch would likely decrease because the weights would not be large enough. Accordingly, there is a demand for smaller, more sensitive acceleration switches.

SUMMARY OF THE INVENTION

It is one object of the present invention to provide an acceleration switch that is small and highly reliable. It is another object of the present invention to provide a method of reliably and simply manufacturing acceleration switches that are small and reliable.

To attain the objects described above, in the first aspect of the present invention, there is provided an acceleration switch adapted to be switched between the states of ON and OFF depending upon the magnitude of acceleration applied. The acceleration switch comprises a substrate and a semiconductor chip mounted on the substrate. The substrate includes a first contact formed thereon. The semiconductor chip includes a movable part adapted to move between an open position and a closed position depending upon the magnitude of acceleration applied. The movable part has a second contact. When the magnitude of the acceleration applied is less than a predetermined value, the movable part is located in the open position and the second contact is spaced from the first contact. When the magnitude of acceleration applied is equal to or greater than the predetermined value, the movable part is located in the closed position and the second contact comes into contact with the first contact.

In a second aspect of the present invention, there is provided a method of manufacturing an acceleration switch having a movable part adapted to move between states of ON and OFF depending upon the magnitude of acceleration applied. The method comprises the steps of forming an N-type silicon epitaxial growth layer on a silicon chip composed of a P-type single crystal, forming a first high concentration P-type silicon layer having a predetermined configuration in the N-type silicon epitaxial growth layer, forming a second high concentration P-type silicon layer having a predetermined configuration on the first high concentration P-type silicon layer in the N-type silicon epitaxial growth layer, reforming the first and second high concentration P-type silicon layers into porous silicon layers by subjecting them to anodic oxidation, and forming the movable part by removing the porous silicon layers by alkali etching.

In a third aspect of the present invention, an air bag system mounted on a car to protect on occupant of the car from the shock of a collision is provided. The system comprises an air bag, an inflator for inflating the air bag, and an ECU for instructing actuation of the inflator. The ECU comprises an acceleration switch for outputting an ON signal to the ECU when acceleration of the car reaches a predetermined value. The acceleration switch comprises a substrate and a semiconductor chip mounted on the substrate. The substrate has a first contact. The semiconductor chip includes a movable part adapted to move between an open position and a closed position depending upon the magnitude of acceleration applied. The movable part is provided with a second contact. When the magnitude of the acceleration applied is less than the predetermined value, the movable part is located in the open position and the second contact is spaced from the first contact. When the magnitude of the acceleration applied is equal to or greater than the predetermined value, the movable part is located in the closed position and the second contact comes into contact with the first contact.

Features of the present invention thought to be novel will be made apparent particularly in the appended claims. The present invention as well as its object and advantages will be understood from the description of embodiments, which are preferred at present, with reference to the accompanying drawings.

BRIEF DESCRIPTION OF THE DRAWINGS

FIG. 1b is a bottom view showing a substrate, which constitutes the acceleration switch shown in FIG. 1a.

FIG. 1c is a plan view showing a silicon chip, which constitutes the acceleration switch shown in FIG. 1a.

FIG. 2a is a plan view showing a silicon chip for illustrating a manufacturing process of the acceleration switch shown in FIG. 1a.

FIG. 2b is a cross sectional view of the silicon chip taken along the line 2b—2b in FIG. 2a.

FIG. 2c is a cross sectional view of the silicon chip taken along the line 2c—2c in FIG. 2a.

FIG. 3b is a cross sectional view of the silicon chip taken along the line 3b—3b in FIG. 3a.

FIG. 3c is a cross sectional view of the silicon chip taken along the line 3c—3c in FIG. 3a.

FIG. 4b is a cross sectional view of the silicon chip taken along the line 4b—4b in FIG. 4a.

FIG. 4c is a cross sectional view of the silicon chip taken along the line 4c—4c in FIG. 4a.

FIG. 5b is a cross sectional view of the silicon chip taken along the line 5b—5b in FIG. 5a.

FIG. 5c is a cross sectional view of the silicon chip taken along the line 5c—5c in FIG. 5a.

FIGS. 7b and 7c are cross sectional views of the acceleration switch taken along the line 7—7 in FIG. 7a.

DETAILED DESCRIPTION OF THE PREFERRED EMBODIMENTS

An acceleration switch 1 according to a first embodiment of the present invention will be described with reference to the drawings.

Figure 9:
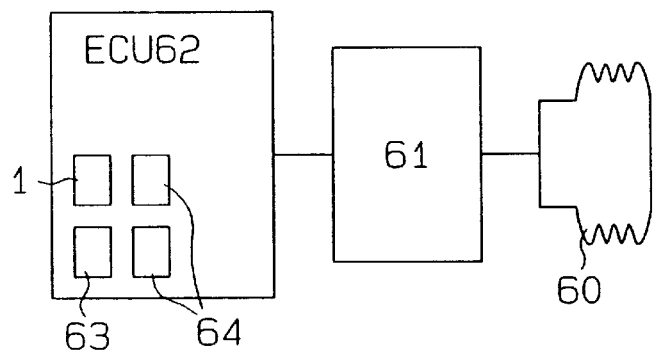
FIG. 9 is a schematic view showing an air bag system.
Figure 10:
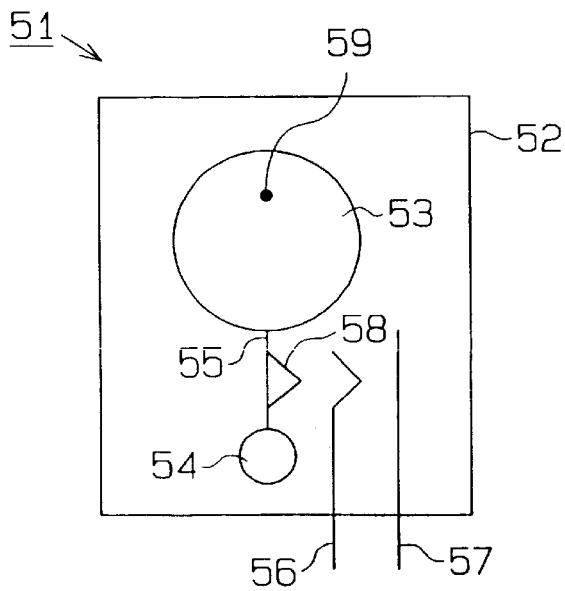
FIG. 10 is a schematic view showing a mechanical type acceleration switch of the prior art.

As shown in FIG. 9, an air bag system includes an air bag 60, an inflator 61 provided with an ignition device, and an ECU 62. The ECU 62 is composed of an acceleration sensor 63, switching elements 64 such as power transistors or the like, and an acceleration switch 1. The acceleration switch 1 is located with its upper side (the side on which a substrate 3 exists) directed toward the direction of forward vehicle movement.

As shown in FIG. 1, the acceleration switch 1 is formed by adhering a silicon chip 2 and the substrate 3 together. A P-type single crystal silicon, which has a (110) face orientation and is in the form of a rectangular parallelepiped, is used as the silicon chip 2. The silicon chip 2 has a thickness on the order of 500 $\mu$m to 600 $\mu$m. Also, the longer sides of the silicon chip 2 have a length on the order of 200 $\mu$m to 1000 $\mu$m, and the shorter sides have a length on the order of 100 $\mu$m to 500 $\mu$m. Epitaxial growth layers 4, 5 of a two-layered structure are formed on a top surface of the silicon chip 2. The first epitaxial growth layer 4, which is on a lower side (inner layer side) of the two-layered structure, is composed of an N-type single crystal silicon and has a thickness of about 15 $\mu$m. The second epitaxial growth layer 5, which is on an upper side (outer layer side) of the two-layered structure, is composed of an N-type single crystal silicon and has a thickness of about 15 $\mu$m. That is, the total thickness of the two epitaxial growth layers 4, 5 is about 30 $\mu$m. The first and second epitaxial growth layers 4, 5 are shown as having exaggerated thicknesses for ease of explanation.

An interior of the silicon chip 2 is concave to form a cavity 6 having a complex configuration, whereby a first inertia weight 7, a second inertia weight 9, and a movable part M1 composed of torsion bars 8, which are first beams, and a beam 10, which is a second beam, are formed. The depth of the cavity 6 is slightly (about 10 $\mu$m) greater than the thickness of the two epitaxial growth layers 4, 5.

Figure 1A:
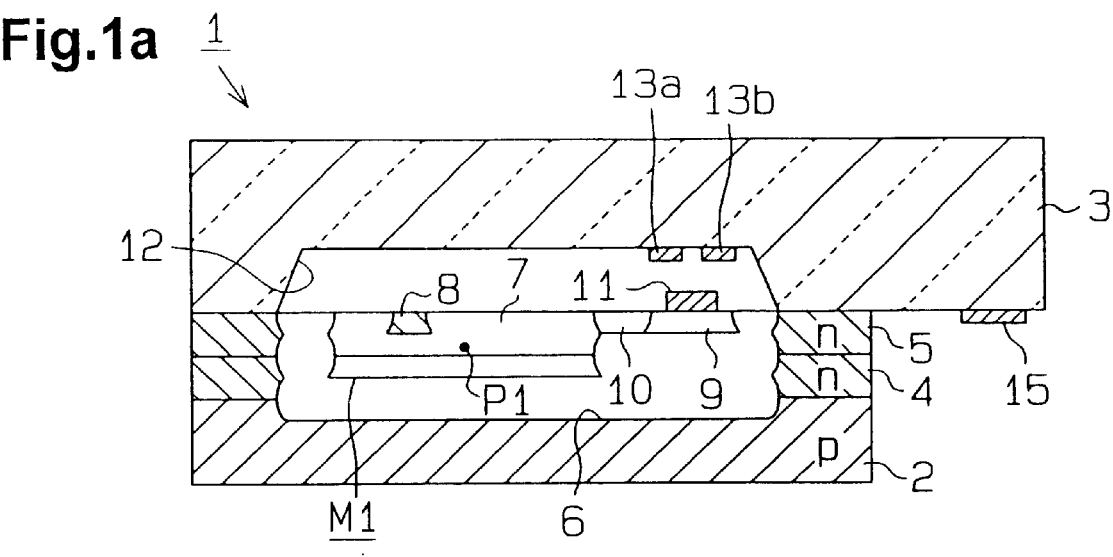
FIG. 1*a* is a cross sectional view showing an acceleration switch according to a first embodiment of the present invention.
Figure 1B:
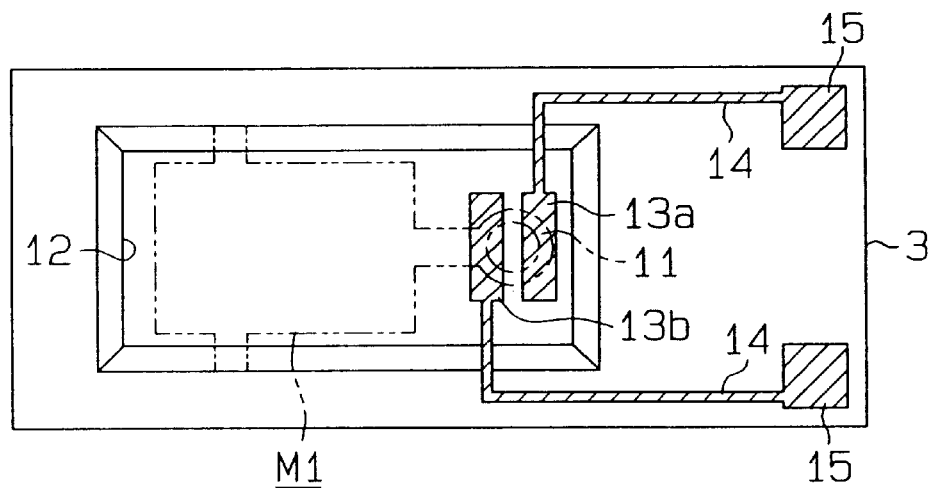
Figure 1C:
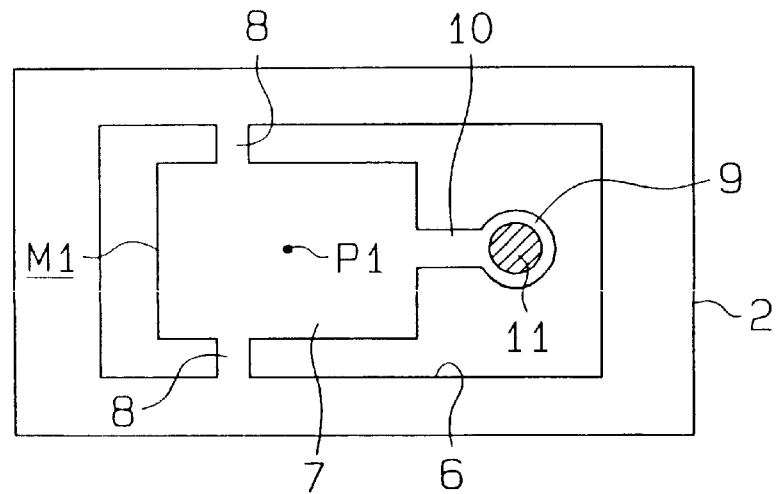
Figure 2A:
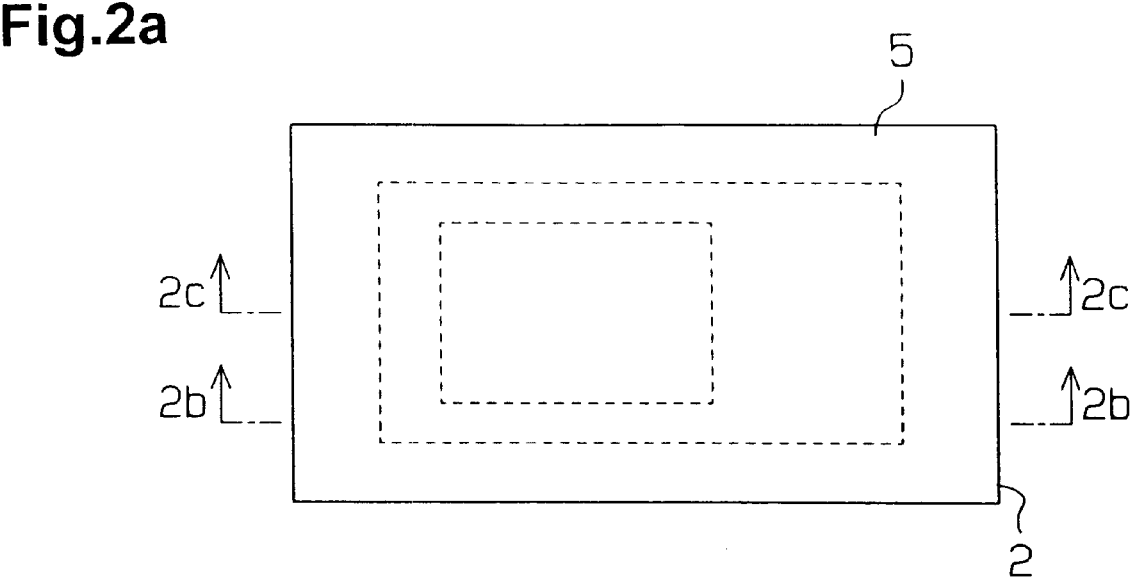
Figure 2B:
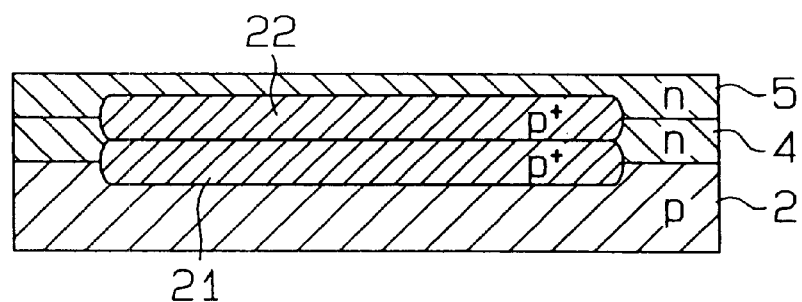
Figure 2C:
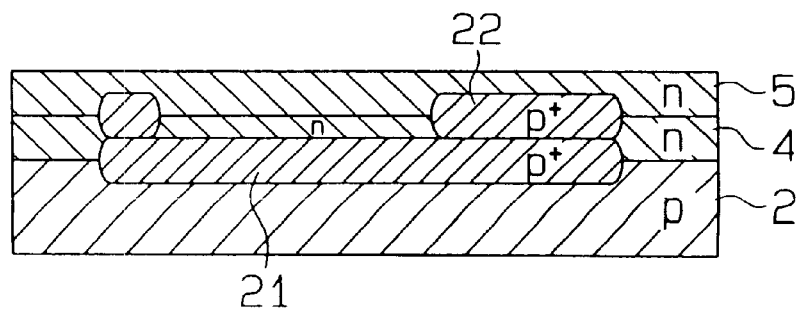
Figure 3A:
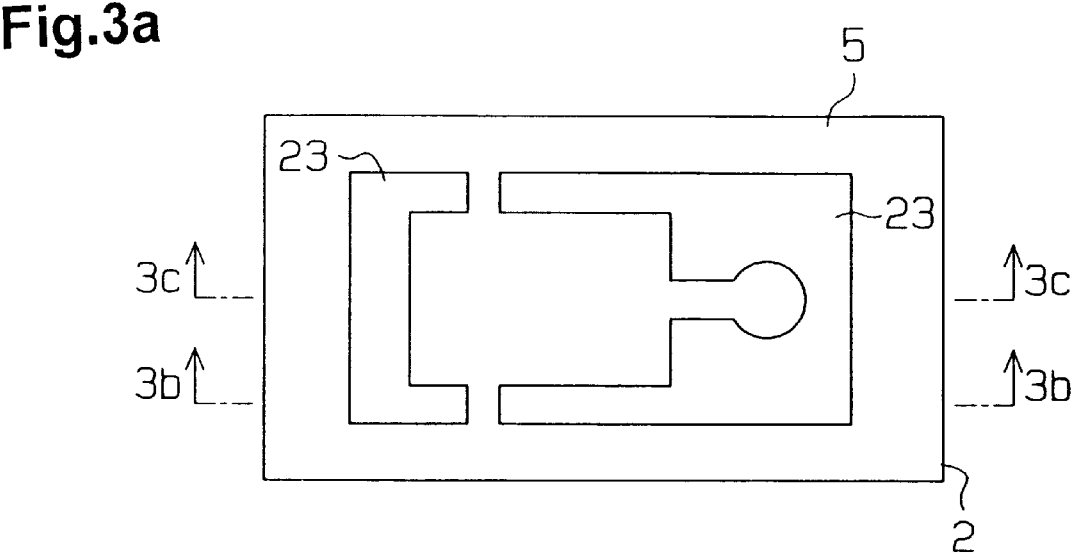
FIG. 3a is a plan view showing a silicon chip for illustrating a manufacturing process of the acceleration switch.
Figure 3B:
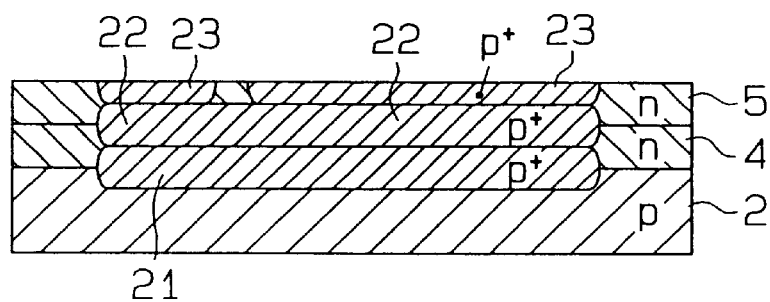
Figure 3C:
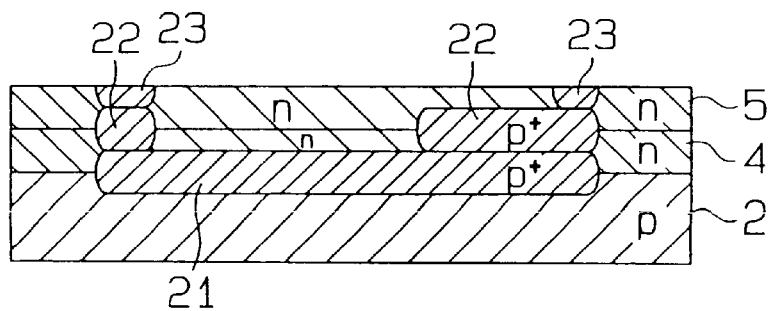
Figure 4A:
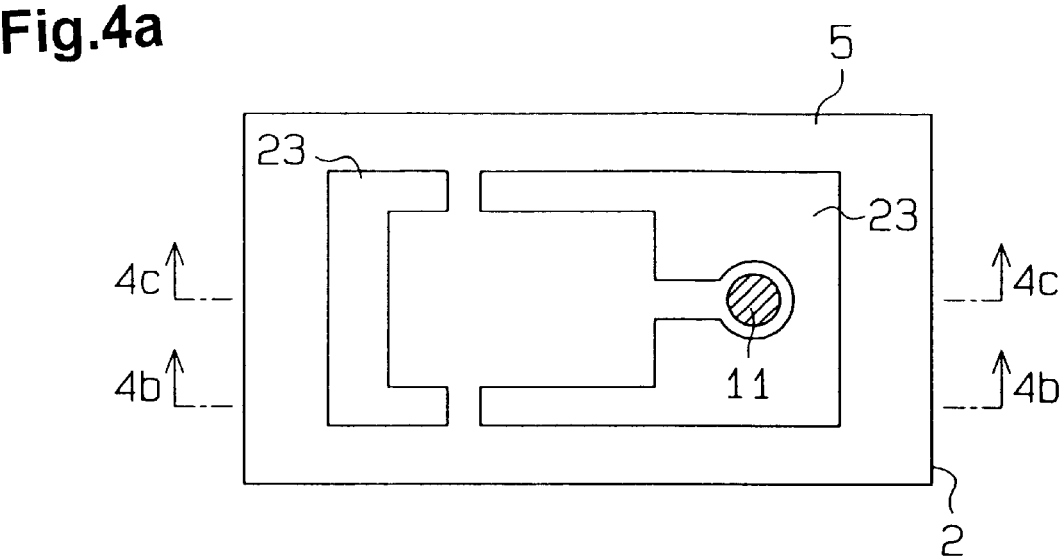
FIG. 4a is a plan view showing a silicon chip for illustrating a manufacturing process of the acceleration switch.
Figure 4B:
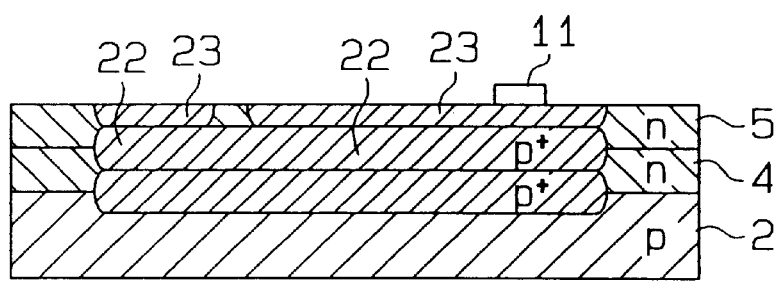
Figure 4C:
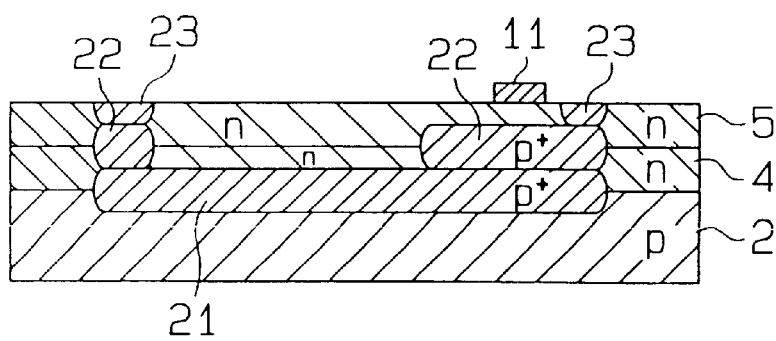
Figure 5A:
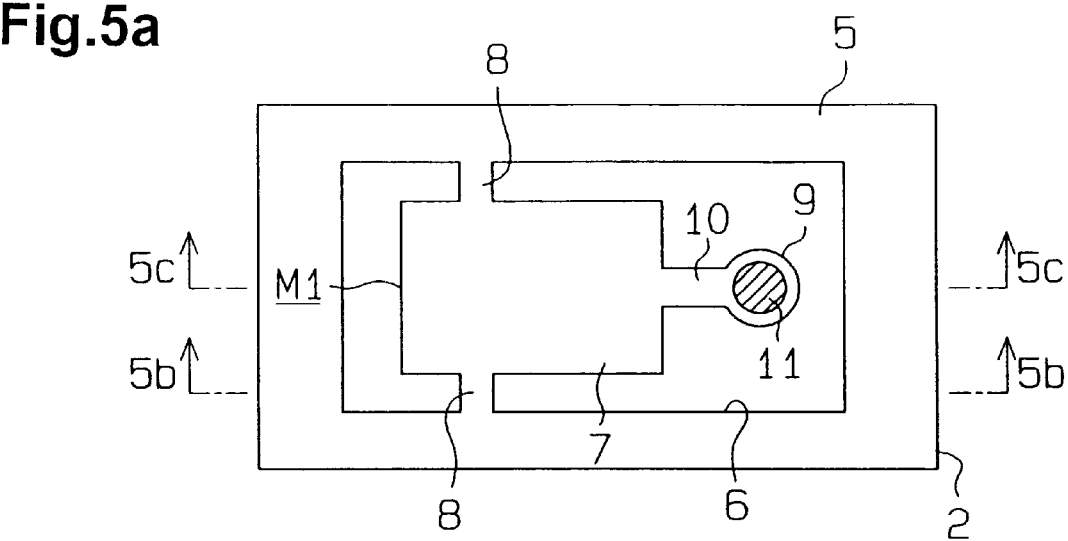
FIG. 5a is a plan view showing a silicon chip for illustrating a manufacturing process of the acceleration switch.
Figure 5B:
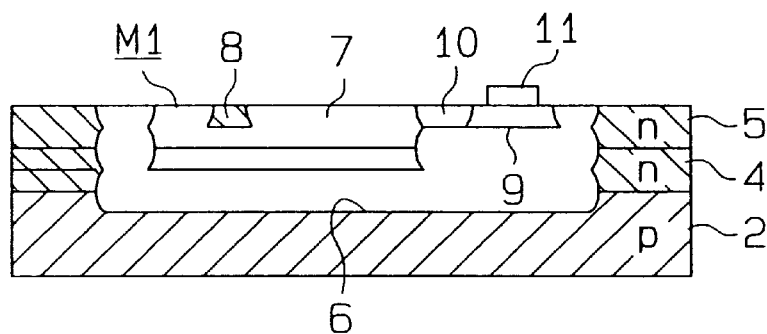
Figure 5C:
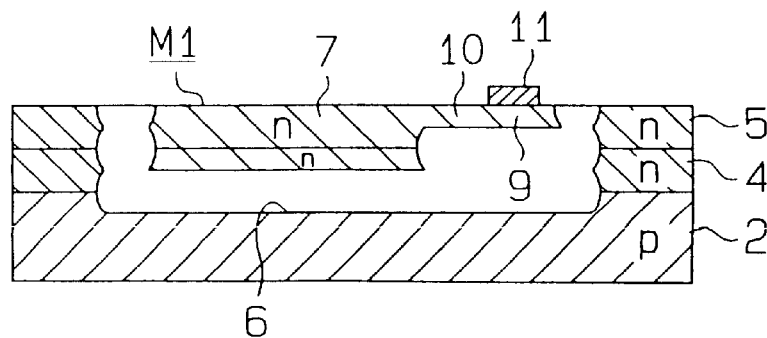

The first inertia weight 7 is rectangular as shown in FIG. 1c, and has a thickness of about 23 $\mu$. The pair of torsion bars 8 are formed to connect the first inertia weight 7 and a corresponding inner side wall of the silicon chip 2. As shown in FIGS. 1a and 1c, the torsion bars 8 are connected to a side of the first inertia weight 7 in a position offset leftwardly of the center of gravity P1 of the first inertia weight 7. That is, the pair of torsion bars 8 act as a turning shaft for rotatably supporting the first inertia weight 7. When the first inertia weight 7 turns, the pair of torsion bars 8 twist. The torsion bars 8 have a thickness (about 7.5 $\mu$m) that is one of that half of the second epitaxial growth layer 5.

The beam 10 connects the first inertia weight 7 and the second inertia weight 9, which has a circular shape. The second inertia weight 9 is supported on the first inertia weight 7 only by the beam 10. The beam 10 and the second inertia weight 9 both have a thickness (about 7.5 $\mu$m) that is one half of that of the second epitaxial growth layer 5.

As shown in FIG. 1c, the second inertia weight 9 is smaller than the first inertia weight 7. Also, as shown in FIG. 1a, the second inertia weight 9 has a wall thickness, that is about one third of the wall thickness of the first inertia weight 7. Thus, the second inertia weight 9 is lighter than the first inertia weight 7. Formed on an upper surface of the second inertia weight 9 is an electrode pattern 11, which is circular and serves as a first contact.

As shown in FIG. 1b, the substrate 3 is rectangular, and has sides that are longer than those of the silicon chip 2. A stock material for the substrate 3 is insulating glass. In place of insulating glass, for example, silicon may be used as the material for the substrate 3. As shown in FIG. 1a, a recess 12 having a trapezoidal cross section is formed on an underside of the substrate 3 in a position corresponding to the cavity 6 of the silicon chip 2. The recess 12 is formed, for example, by etching. The substrate 3 is applied to the upper surface (the upper surface of the second epitaxial growth layer 5) of the silicon chip 2 by an adhesive.

A pair of electrode patterns 13a, 13b are formed on a roof surface of the recess 12 in positions facing the electrode pattern 11. Such electrode patterns 13a, 13b are located parallel to each other with a predetermined spacing therebetween. The respective electrode patterns 13a, 13b are electrically connected through respective wiring patterns 14 to a pair of bonding pads 15 located externally of the recess 12. When acceleration of a predetermined value or greater is applied to the acceleration switch 1, the second inertia weight 9 moves into contact with both electrode patterns 13a, 13b.

The action of the acceleration switch 1 will be described hereinafter.

Because acceleration is zero when the car is stopped or moves at a constant speed, no force of inertia acts on the movable part M1, and the movable part M1 does not move. Therefore, the acceleration switch 1 is maintained in a state shown in FIG. 1.

Figure 6:
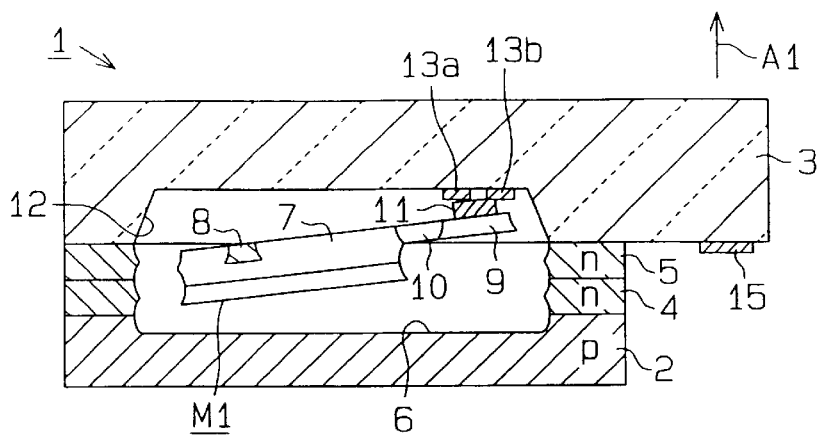
FIG. 6 is an enlarged, cross sectional view of the acceleration switch in a state, in which acceleration applies.

On the other hand, a great acceleration due to a sudden reduction in speed is applied to the acceleration switch 1 if the car experiences a head-on collision. Then, the movable part M1 is subjected to the force of inertia in a direction along the arrow A1 in FIG. 6.

When acceleration exceeding the predetermined value is applied to the acceleration switch 1, not only the second inertia weight 9 and the beam 10 but also the heavy first inertia weight 7 turn about the torsion bars 8 in the counterclockwise direction in FIG. 1a. As a result, the second inertia weight 9 moves up to a predetermined position (to the bottom surface of the recess 12), so that the electrode pattern 11 contacts the electrode patterns 13a, 13b. The electrode patterns 13a, 13b are electrically connected to each other by the electrode pattern 11, so that the acceleration switch 1 is turned ON. At this time, the acceleration switch 1 issues an ON signal to an outside circuit through the pair of bonding pads 15. Then the power transistors are energized to rapidly output a great amount of current outside the ECU. Such current from the ECU actuates the ignition device to inflate the air bag instantaneously.

On the other hand, when acceleration below the predetermined value is applied, the heavy first inertia weight 7 does not turn about the torsion bars 8. Thus even if the beam 10 flexes to some extent, the second inertia weight 9 does not move to the above-described predetermined position. Therefore, the contacts remain open, so that the pair of electrode patterns 13a, 13b are not electrically connected to each other. Thus, the acceleration switch 1 is kept OFF. Accordingly, since the ignition device is not actuated, the air bag does not inflate. In this manner, the acceleration switch 1 closes only when acceleration that is equal to or greater than the predetermined value is applied.

A manufacturing process for the acceleration switch 1 according to the present embodiment will be described hereinafter. The acceleration switch 1 is manufactured by surface micromachining.

The substrate 3 is processed in the following manner. First, a rectangular-shaped glass substrate (for example, Pyrex (trade mark) glass) is prepared. The recess 12 having a predetermined configuration is formed on an underside of the glass substrate by etching. Then the glass substrate 3 is masked over the predetermined configuration. A layer of electrically conductive metal, such aluminum, is formed on the glass substrate 3 by sputtering. Thus the second electrode patterns 13a, 13b, the wiring patterns 14 and the bonding pads 15 are formed. It is possible to employ a wet-type film formation process, for example, electroless plating or the like, in place of the dry process of sputtering.

A process for making the silicon chip 2 follows with reference to FIGS. 2 to 5. First, a silicon chip 2 composed of a P-type single crystal silicon in the form of a rectangular parallelepiped and having the (110) face orientation is prepared. An upper surface of the silicon chip 2 is masked over an unillustrated predetermined configuration, and photoetching is used to form an opening portion in the predetermined region at locations other than the masked portion. Then, ion implantation or the like is used to strike a P-type impurity, such as boron, of a predetermined concentration into the silicon chip 2, and the P-type impurity is further made to effect thermal diffusion. As a result, a lower first high concentration P-type silicon layer (lower $p^+$ silicon embedded layer) 21 is formed in a predetermined location on the silicon chip 2 (see FIG. 2b). The lower $p^+$ silicon embedded layer 21 is formed to correspond to the cavity formed below the first inertia weight 7, the torsion bars 8, the beam 10 and the second inertia weight 9.

Then, vapor growth is used to form the first epitaxial growth layer 4 composed of N-type single crystal silicon on the entire upper surface of the silicon chip 2, on which the $p^+$ silicon embedded layer 21 has been formed. As a result, the $p^+$ silicon embedded layer 21 is embedded in the first epitaxial growth layer 4 (see FIG. 2). Thereafter, an unillustrated mask is formed on the first epitaxial growth layer 4, and photoetching is used to form an opening region in a predetermined region of the masked portion. Ion implantation or the like is used to implant a P-type impurity into the opening region, and the P-type impurity is further made to effect thermal diffusion. As a result, an upper first high concentration P-type silicon layer (upper $p^+$ silicon embedded layer) 22 is formed on the first epitaxial growth layer 4. The upper $p^+$ silicon embedded layer 22 reaches the upper surface of the $p^+$ silicon embedded layer 21, which has been formed to lie under the upper layer 22. The $p^+$ silicon embedded layer 22 is formed in a position corresponding to the first inertia weight 7, the torsion bars 8, the beam 10, and the second inertia weight 9, which are formed later.

Then, vapor growth is used to form the second epitaxial growth layer 5, which is composed of an N-type single crystal silicon, on the entire upper surface of the first epitaxial growth layer 4. As a result, the $p^+$ silicon embedded upper layer 22 is embedded in the second epitaxial growth layer 5 (see FIG. 2). Thereafter, an unillustrated mask is formed on the second epitaxial growth layer 5, and photoetching is used to form an opening portion in a predetermined region of the masked portion. A P-type impurity is struck into the opening portion, and the P-type impurity is further made to effect thermal diffusion. As a result, a second high concentration P-type silicon layer ($p^+$ silicon diffused layer) 23 is formed on the first and second epitaxial growth layers 4, 5 (see FIG. 3). The $p^+$ silicon diffused layer 23 is formed on the upper $p^+$ silicon embedded layer 22. The $p^+$ silicon diffused layer 23 is correspondingly formed on portions surrounding the first inertia weight 7, the second inertia weight 9, the torsion bars 8 and the beam 10. In other words, the $p^+$ silicon diffused layer 23 is formed in a predetermined region to leave portions that are to make both inertia weights 7, 9, the torsion bars 8, and the beam 10.

Then, oxide films (not shown) are formed on upper and lower surfaces of the silicon chip 2 by heating the chip in an atmosphere of oxygen or air. Aluminum layers are formed on the oxide films by means of sputtering or vacuum deposition. Thereafter, photolithography is used to form the first electrode pattern 11 on the surface of a region where the second inertia weight 9 is to be formed (see FIG. 4). Incidentally, physical film forming conditions are set to prevent comparatively great stresses from remaining in the first electrode pattern 11. The reason for this is that it is not desirable for the electrode pattern 11 to curve.

Further, a metallic protective film is formed by sputtering or vacuum deposition using of a metal such as tungsten (W), molybdenum (Mo) or the like. Thereafter, photolithography is used to form an unillustrated opening portion on a part of the metallic protective film. Thereafter, the upper surface of the p+ silicon diffused layer 23, which has been covered by the oxide films is exposed by removing the oxide films over the opening portion. The reason why tungsten (W) and molybdenum (Mo) are selected is that such metals resist hydrofluoric acid.

The silicon chip 2, after having gone through the above-described masking process, is subjected to anodic oxidation as follows. "Anodic oxidation" is defined in the specification of this application as a batch reforming processing for forming a porous layer on a substrate by causing an electric current to flow through the substrate in an electrolyte with the substrate as an anode.

A tank is filled with high-concentration hydrofluoric acid (HF) solution for the anodic oxidation. A counter electrode made of platinum and the silicon chip 2 are immersed in the hydrofluoric acid solution facing each other. An anode side of a DC power source is electrically connected to a back side of the silicon chip 2, and a cathode side of the DC power source is electrically connected to the counter electrode. Thus, direct current is made to flow toward the front side of the silicon chip 2 from the back side. Then, portions (that is, the p+ silicon embedded layers 21, 22 and the p+ silicon diffused layer 23) composed of high concentration P-type silicon are selectively made porous in the silicon chip 2. As a result, these layers 21, 22, 23 are batch reformed to be made porous silicon layers.

The resulting porous silicon layers are subjected to the anodic oxidation processing and then to alkali etching before peeling of the metallic protective film. Here, for example, TMAF (tetramethyl ammonium hydroxide) is used as an etchant. As a result, the porous silicon layers dissolve and are removed. The porous silicon layers, which are batch reformed portions, tend to dissolve in an alkali solution, as compared with fine silicon layers, which are non-reformed portions. Therefore, a concavity is easily formed. As a result, the cavity 6 is formed in the silicon chip 2, and the movable part M1 is formed (see FIG. 5). The substrate 3, which has been previous manufactured, is applied to the resulting silicon chip 2 to thereby finish the acceleration switch 1 shown in FIG. 1.

This embodiment has the following effects.

(1) Because the movable part M1 is formed by surface micromachining, it is possible to make an ECU that is small as compared with conventional ECUs that include mechanical switches. Further, since the acceleration switch 1 is not of the electronic type, it is influenced less by electromagnetic waves irradiated from surrounding equipment and possesses an excellent anti-EMI property. Therefore, ECUs provided with such an acceleration switch 1 are highly reliable. Also, the use of an ECU provided with such an acceleration switch 1 results in a very reliable air bag system that inflates the air bag when needed.

(2) The first electrode pattern 11 was formed on the surface of the second inertia weight 9, and the second electrode patterns 13a, 13b were formed on the roof surface of the recess 12. The second inertia weight 9 contact with the roof surface of the recess 12 when acceleration is applied. Since the two contacts (the first electrode pattern 11 and the second electrode patterns 13a, 13b) can contact each other only when acceleration exceeding the set value is applied, the acceleration switch 1 only outputs an ON signal externally when acceleration exceeding the set value is applied.

(3) The manufacturing method according to the present embodiment can cavitate only designated regions accurately and efficiently by alkali etching after anodic oxidation. This is because it is comparatively simple to form the high concentration P-type silicon layers, which will become porous silicon layers, in accordance with a design. Also, alkali etching can dissolve and remove the resulting porous silicon layers according to their configurations. With such a manufacturing method, unlike processes performed by etching from the back surface of the chip, it is possible to form the movable part M1, which has fine and complex configuration, with comparative ease. Therefore, it is possible to reliably and simply manufacture an acceleration switch 1 having the above-described properties.

Figure 7A:
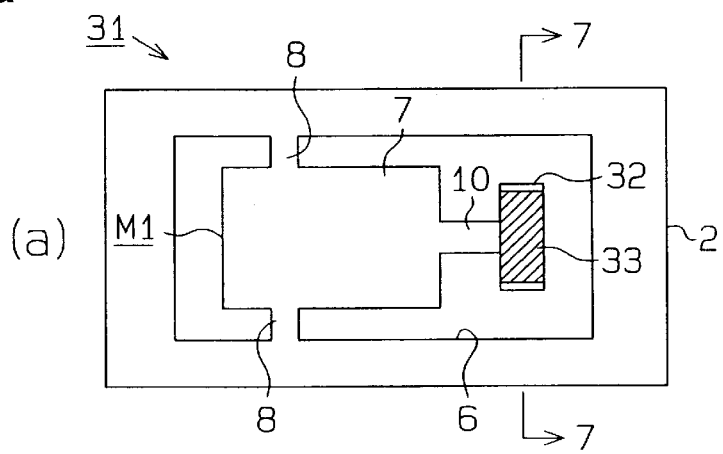
FIG. 7a is a plan view showing an acceleration switch according to a second embodiment of the present invention.

An acceleration switch 31 according to the second embodiment of the present invention will be described with reference to FIGS. 7a to 7c. Here, differences from the first embodiment are mainly described, and common points are designated by using the same reference numerals as in the first embodiment, and an explanation of the common points is omitted.

A second inertia weight 32 and an electrode pattern 33 in the acceleration switch 31 differ in configuration from the second inertia weight 9 and the first electrode pattern 11 in the first embodiment. The second inertia weight 32 of the second embodiment is substantially rectangular as shown in FIG. 7a. A beam 10 is connected at one of its ends to the center of a side of the second inertia weight 32. Also, the first electrode pattern 33 is similarly rectangular and is formed on the entire surface of the second inertia weight 32. Both ends of the second inertia weight 32 are formed to curve toward the substrate 3. Therefore, both ends of the electrode pattern 33 on the second inertia weight 32 similarly curve toward the substrate 3.

A method of forming the electrode pattern 33, which has a curved contact, may include, for example, the following process of forming a curved contact prior to the anodic oxidation.

More specifically, the physical film forming conditions are set beforehand to cause relatively great stresses to reside in the electrode pattern 33, which is composed of metal, when sputtering or vacuum deposition of aluminum is performed on oxide films. Under such conditions, the entire electrode pattern 33 contracts due to the action of the residual stresses when the second inertia weight 32 is later formed through alkali etching. As a result, the surface of the second inertia weight 32 on which the electrode pattern is formed contracts, so that both the second inertia weight 32 and the electrode pattern 33 curve toward the substrate 3.

Operation of the acceleration switch 31 will be described hereinbelow.

Figure 7B:
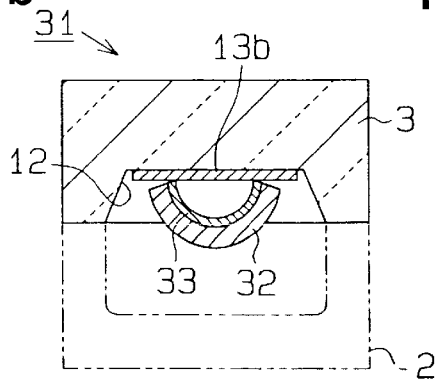
Figure 7C:
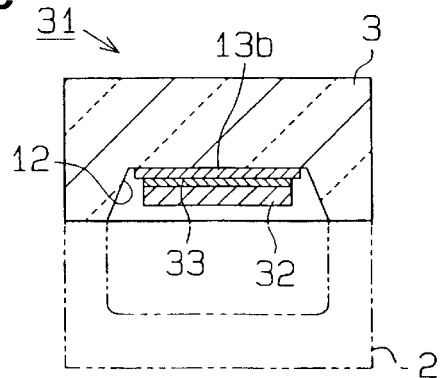

When sufficiently great acceleration, equal to or greater than the set value is applied, the second inertia weight 32, which is curved, moves toward the substrate 3, and the ends of the electrode pattern 33 first come contact the pair of electrode patterns 13a, 13b (see FIG. 7b). As the second inertia weight 32 moves further toward the substrate 3, the second inertia weight 32 is pushed against the substrate 3, resulting in the space between the ends of the second inertia weight 32 being enlarged, and the second inertia weight 32 soon becomes flat. During this step, the first electrode pattern 33 continues to contact the second electrode patterns 13a, 13b (see FIG. 7c). Also, even when the applied acceleration decreases, the first electrode pattern 33 continues to contact the second electrode patterns 13a, 13b in a state shown in FIG. 7c until the magnitude of the acceleration decreases to a level equal to or less than the predetermined value. Of course, when the electrode patterns 33, 13a, 13b contact each other, an ON signal continues to be sent from the acceleration switch 31.

Thus, the second embodiment offers the following effects in addition to the effects (1) to (3) in the first embodiment.

(4) The acceleration switch 31 employs the second inertia weight 32 and the first electrode pattern 33, which are curved. As a result, it is possible to comparatively prolong the time during which the contacts are in contact and thus prolong the time during which the acceleration switch 31 holds an ON signal (here, at least 10 ms). Accordingly, it is a highly reliable air bag system results by using ECUs provided with the acceleration switch 31.

(5) A curved contact forming process for using a physical film forming method to form the first electrode pattern 33 of metal on the surface of a region forming the second inertia weight 32 is carried out prior to the anodic oxidation. Therefore, it is possible, according to the method, to easily form a curved electrode pattern 33 on the second inertia weight 32.

Figure 8:
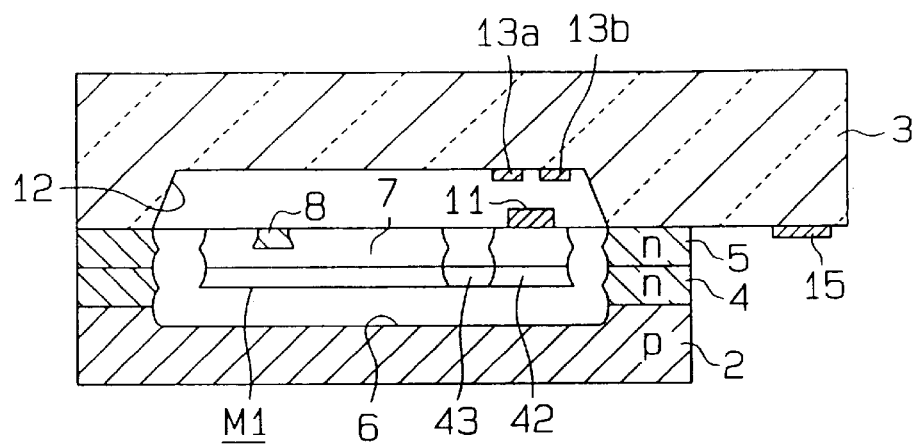
FIG. 8 is an enlarged, cross sectional view showing an acceleration switch according to a third embodiment of the present invention.

An acceleration switch 41 according to a third embodiment of the present invention is shown in FIG. 8. The acceleration switch 41, a beam 43 and a second inertia weight 42 are formed to have substantially the same thickness as that of the first inertia weight 7. The rigidity of the beam 43 is high in the acceleration switch 41.

In addition, the respective embodiments described above may be modified in the following manner.

For example, an acceleration sensor of a strain gauge type or the like may be formed in a vacant region above the silicon chip 2. Furthermore, a signal processing circuit for processing of a signal issued from the acceleration sensor, as well as various correction circuits may be formed in combination in the vacant region.

The acceleration switches 1, 31, 41 in the present invention can be applied for uses other than air bag systems, for example, ABS (anti-lock brake systems), suspension control systems and so on.

While the embodiments of the present invention have been described in association with the drawings, the present invention is not limited thereto but can be modified within the scope of the appended claims and their equivalents.

What is claimed is:

1. An acceleration switch comprising:
   a substrate;
   a first contact formed on the substrate;
   a chip attached to the substrate, wherein the chip includes:
      a movable part that moves between an open position and a closed position depending on the level of acceleration being applied to the switch, said movable part comprising:
         a first inertia weight;
         a first beam that supports the first inertia weight at a position that is offset from the center of gravity of the first inertia weight;
         a second inertia weight, wherein the second inertia weight is lighter than the first inertia weight, and the second inertia weight supports the second contact; and
         a second beam that connects the first inertia weight to the second inertia weight; and
      a second contact supported by the movable part, wherein the movable part is located in an open position, at which the second contact is spaced from the first contact, when the level of acceleration applied to the switch is below a predetermined level, and the movable part moves to a closed position, at which the second contact touches the first contact, when the level of acceleration applied to the switch exceeds the predetermined level.

2. The acceleration switch according to claim 1, wherein the first beam is constructed and arranged to twist when the switch is subjected to acceleration.

3. The acceleration switch according to claim 1, wherein the movable part is formed integrally with the chip by surface micromachining.

4. The acceleration switch according to claim 3, wherein the second contact is formed on an upper surface of the chip, which faces the substrate, and the first contact is formed on a lower surface of the substrate, which faces the chip, wherein the lower surface of the substrate is adhered to the upper surface of the chip.

5. The acceleration switch according to claim 4, wherein the second inertia weight is arcuate, the second contact is located on a concave surface of the second inertia weight, the second beam is connected to an intermediate portion of the second inertia weight, and distal ends of the second inertia weight face the first contact.

6. The acceleration switch according to claim 1, wherein the cross sectional area of the second beam is smaller than that of the first inertia weight and that of the second inertia weight.

7. The acceleration switch according to claim 1, wherein the thickness of the second beam is substantially the same as that of the first inertia weight.

8. An air bag apparatus attached to a vehicle to protect an occupant from shock during a collision, the apparatus comprising:
   an air bag;
   an inflator for inflating the air bag; and
   a controller for instructing actuation of the inflator, the controller comprising an acceleration switch for sending a signal to the controller when acceleration of the vehicle reaches a predetermined value, the acceleration switch comprising:
      a substrate;
      a first contact formed on the substrate; and
      a chip attached to the substrate, wherein the chip includes:
         a movable part that moves between an open position and a closed position depending on the level of acceleration being applied to the switch, said movable part comprising:
            a first inertia weight;
            a first beam that supports the first inertia weight at a position that is offset from the center of gravity of the first inertia weight;
            a second inertia weight, wherein the second inertia weight is lighter than the first inertia weight, and the second inertia weight supports the second contact; and
            a second beam that connects the first inertia weight to the second inertia weight; and
         a second contact supported by the movable part, wherein the movable part is located in an open position, at which the second contact is spaced from the first contact, when the level of acceleration applied to the switch is below a predetermined level, and the movable part moves to a closed position, at which the second contact touches the first contact, when the level of acceleration applied to the switch exceeds the predetermined level.

9. The air bag apparatus according to claim 8, wherein the first beam is constructed and arranged to twist when the switch is subjected to acceleration.

10. The air bag apparatus according to claim 8, wherein the movable part is formed integrally with the chip by surface micromachining.

11. The air bag apparatus according to claim 10, wherein the second contact is formed on an upper surface of the chip, which faces the substrate, and the first contact is formed on a lower surface of the substrate, which faces the chip, wherein the lower surface of the substrate is adhered to the upper surface of the chip.

12. The air bag apparatus according to claim 11, wherein the second inertia weight is arcuate, the second contact is located on a concave surface of the second inertia weight, the second beam is connected to an intermediate portion of the second inertia weight, and distal ends of the second inertia weight face the first contact.

13. The air bag apparatus according to claim 8, wherein the cross sectional area of the second beam is smaller than that of the first inertia weight and that of the second inertia weight.

14. The air bag apparatus according to claim 8, wherein the thickness of the second beam is substantially the same as that of the first inertia weight.

* * * * *